US012744477B2

(12) United States Patent
Nagarajan

(10) Patent No.: US 12,744,477 B2
(45) Date of Patent: Sep. 22, 2026

(54) ELEVATOR MACHINE BRAKING

(71) Applicant: OTIS ELEVATOR COMPANY, Farmington, CT (US)

(72) Inventor: Prasanna Nagarajan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 897 days.

(21) Appl. No.: 18/166,511

(22) Filed: Feb. 9, 2023

(65) Prior Publication Data

US 2024/0275313 A1 Aug. 15, 2024

(51) Int. Cl.
*H02P 3/22* (2006.01)
*B66B 1/06* (2006.01)
*B66B 11/04* (2006.01)

(52) U.S. Cl.
CPC .................. *H02P 3/22* (2013.01); *B66B 1/06* (2013.01); *B66B 11/043* (2013.01)

(58) Field of Classification Search
CPC ......... B66B 1/302; B66B 11/043; B66B 1/06; B66B 1/308; B66B 1/34; B66D 5/02
USPC .......................................................... 187/288
See application file for complete search history.

(56) References Cited

U.S. PATENT DOCUMENTS 5,698,823 A 12/1997 Tanahashi
6,056,088 A 5/2000 Gerstenkorn
6,573,681 B2 6/2003 Schwesig
8,207,700 B2 6/2012 Syrman et al.
9,434,575 B2 9/2016 Kattainen et al.
9,975,729 B2 5/2018 Rogers et al.
10,899,579 B2 1/2021 Nakari
11,008,197 B2 5/2021 Nikander et al.
11,192,752 B2 * 12/2021 Camenzind ............. B66B 5/027
11,296,623 B2 4/2022 Nagarajan et al.
(Continued)

FOREIGN PATENT DOCUMENTS

EP 2174410 B1 2/2018
EP 3901077 A1 10/2021
(Continued)

OTHER PUBLICATIONS

Kauppinen et al. (EP 3901077 A1) Elevator Safety System, Elevator, and Method for Performing a Safety Shutdown of an Elevator (Year: 2021).*
(Continued)

*Primary Examiner* — Jorge L Carrasquillo
(74) *Attorney, Agent, or Firm* — Carlson, Gaskey & Olds, P.C.

(57) ABSTRACT

An elevator machine assembly includes a motor and an elevator drive configured to control power supply to the motor. The elevator drive includes at least a plurality of converter switches and an energy storage device that is situated to be charged in response to the motor generating a back emf as the motor rotates in response to a torque applied to the motor when the elevator drive is not providing power to the motor. A short-circuiting module that is selectively coupled with the energy storage device through the converter switches selectively discharges the energy storage device to limit the back emf of the motor and a corresponding speed at which the motor rotates.

20 Claims, 3 Drawing Sheets

(56) References Cited

U.S. PATENT DOCUMENTS

| | | | |
|---|---|---|---|
| 11,325,808 | B2 | 5/2022 | Nakari et al. |
| 2018/0282123 | A1 | 10/2018 | Raassina et al. |

FOREIGN PATENT DOCUMENTS

| | | | |
|---|---|---|---|
| JP | 1992286587 | A | 3/1991 |
| WO | 2010026283 | A1 | 3/2010 |

OTHER PUBLICATIONS

Hirano (JP 2000325687 A) Drum Type Washing Machine (Year: 2000).*

Kishikawa et al. (JP 2001008459 A) Controller for Elevator (Year: 2001).*

* cited by examiner

ELEVATOR MACHINE BRAKING

BACKGROUND

Elevator systems are in widespread use for carrying passengers between various levels in buildings, for example. Some elevator systems are traction-based in which roping that suspends the elevator car and a counterweight facilitates movement of the elevator car when needed. The roping moves in response to movement of a traction sheave, which is driven by a machine motor or prevented from rotating by a machine brake. In most situations, the machine brake is applied or dropped to stop the elevator car. Alternative or additional ways of braking movement of the elevator car at the machine are needed to comply with some elevator codes, for example.

SUMMARY

An illustrative example embodiment of an elevator machine assembly includes a motor and an elevator drive configured to control power supply to the motor. The elevator drive includes at least a plurality of converter switches and an energy storage device that is situated to be charged in response to the motor generating a back emf as the motor rotates in response to a torque applied to the motor when the elevator drive is not providing power to the motor. A short-circuiting module that is selectively coupled with the energy storage device through the converter switches selectively discharges the energy storage device to limit the back emf of the motor and a corresponding speed at which the motor rotates.

In addition to one or more of the features described above, or as an alternative, the short-circuiting module comprises a plurality of resistors and a switch that selectively couples the resistors and the converter switches.

In addition to one or more of the features described above, or as an alternative, the switch of the short-circuiting module couples the resistors to the converter switches in response to the elevator drive disconnecting the motor from power.

In addition to one or more of the features described above, or as an alternative, the switch of the short-circuiting module comprises a relay switch that closes in response to the elevator drive disconnecting the motor from power.

In addition to one or more of the features described above, or as an alternative, the elevator drive comprises a brake control that determines a voltage of the energy storage device and controls the converter switches to selectively couple the short-circuiting module and the energy storage device to maintain the voltage of the energy storage device within a preselected range.

In addition to one or more of the features described above, or as an alternative, the converter switches each comprise an IGBT or a MOSFET and the brake control turns on the IGBTs in response to the voltage exceeding a preselected threshold.

In addition to one or more of the features described above, or as an alternative, the brake control turns the IGBTs or MOSFETs on and off repeatedly to allow the voltage of the energy storage device to repeatedly increase and decrease within the preselected range.

In addition to one or more of the features described above, or as an alternative, the energy storage device comprises a capacitor.

In addition to one or more of the features described above, or as an alternative, the short-circuiting module comprises a plurality of resistors and a switch that selectively couples the resistors to the converter switches, the converter switches each comprise an IGBT or a MOSFET, and the energy storage device comprises a capacitor.

An illustrative example embodiment includes a method of using an elevator machine to control movement of an associated elevator car. The elevator machine includes a motor configured to selectively move the elevator car and an elevator drive configured to control power supply to the motor, the elevator drive having an energy storage device and converter switches. The method includes determining that a voltage of the energy storage device exceeds a preselected threshold. The voltage of the energy storage device is based on a back emf of the motor rotating when the elevator drive is not supplying power to the motor, using the converter switches to couple the energy storage device and a short-circuiting module based on the voltage of the energy storage device exceeding the preselected threshold, and discharging the energy storage device using the short-circuiting module to maintain the voltage of the energy storage device and the back emf of the motor within respective preselected ranges.

In addition to one or more of the features described above, or as an alternative, the method includes using the converter switches to uncouple the energy storage device from the short-circuiting module once the voltage of the energy storage device drops to a selected value.

In addition to one or more of the features described above, or as an alternative, the method includes allowing the back emf of the motor to recharge the energy storage device and repeating each of determining that the voltage of the energy storage device exceeds the preselected threshold, using the converter switches to couple the energy storage device and the short-circuiting module, and discharging the energy storage device.

In addition to one or more of the features described above, or as an alternative, the converter switches comprise IGBTs or MOSFETs and using the converter switches to couple the energy storage device and a short-circuiting module comprises selectively turning on the IGBTs or MOSFETs.

In addition to one or more of the features described above, or as an alternative, the short-circuiting module comprises a plurality of resistors and a switch that selectively couples the resistors and the converter switches in response to the elevator drive disconnecting the motor from power.

In addition to one or more of the features described above, or as an alternative, the switch of the short-circuiting module comprises a relay switch that closes in response to the elevator drive disconnecting the motor from power.

In addition to one or more of the features described above, or as an alternative, the method includes repeatedly turning the converter switches on and off to allow the voltage of the energy storage device to repeatedly increase and decrease within the preselected range.

In addition to one or more of the features described above, or as an alternative, the energy storage device comprises a capacitor.

In addition to one or more of the features described above, or as an alternative, the short-circuiting module comprises a plurality of resistors and a switch that selectively couples the resistors and the converter switches, the converter switches each comprise an IGBT or a MOSFET, and the energy storage device comprises a capacitor.

The various features and advantages of an example embodiment will become apparent to those skilled in the art from the following detailed description. The drawings that accompany the detailed description can be briefly described as follows.

DETAILED DESCRIPTION

Figure 1:
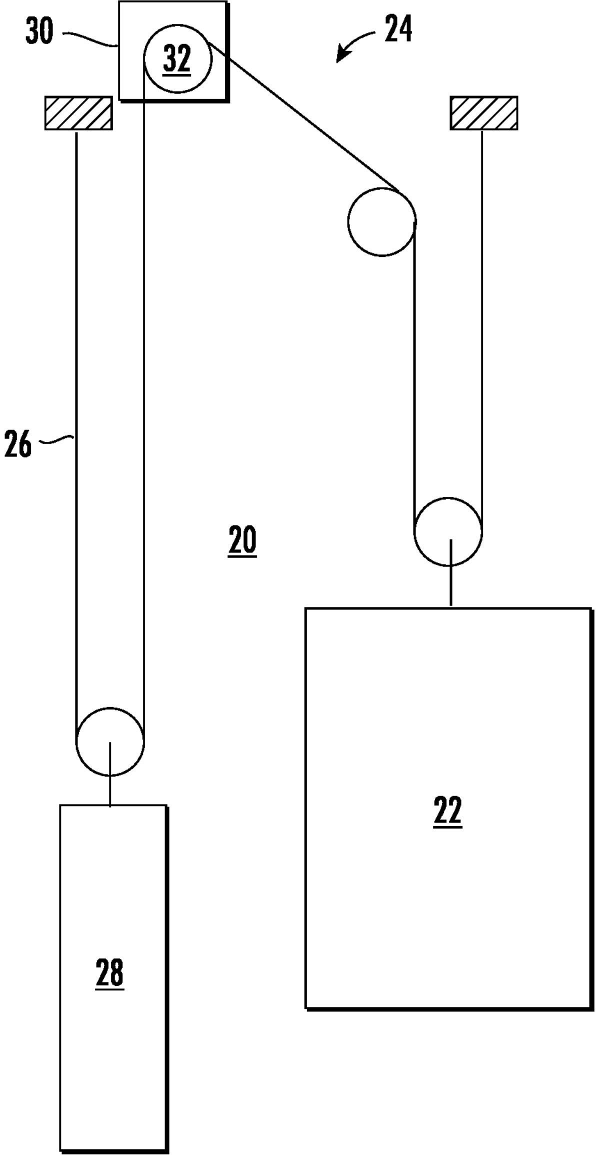
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of load-bearing suspension members 26. The elevator car 22 is coupled to a counterweight 28 by the suspension members 26. A machine 30 includes a traction sheave 32 for controlling movement of the elevator car. As the suspension members 26 move in response to rotation of the traction sheave 32, the elevator car 22 and counterweight 28 move vertically. A machine brake (not illustrated) selectively applied a braking force to prevent the traction sheave 32 from rotating and, thereby, prevents the elevator car 22 from moving.

Figure 2:
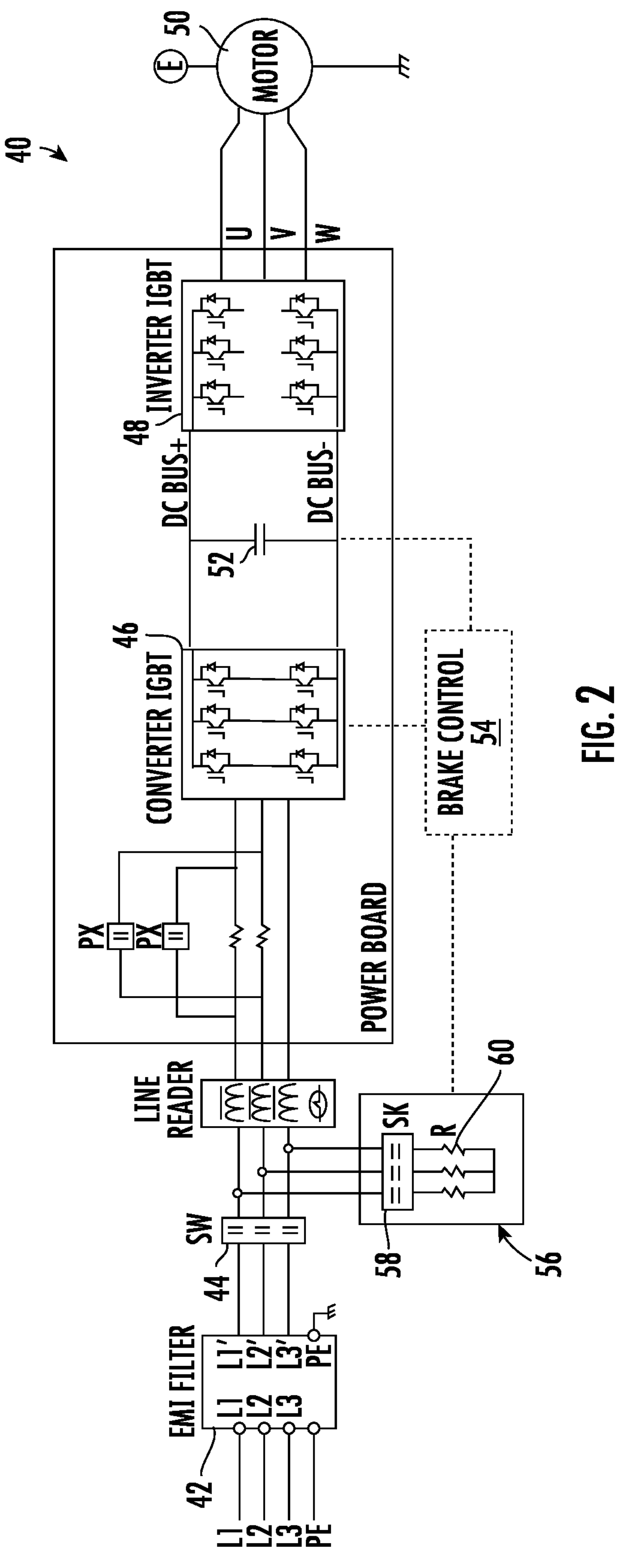
FIG. 2 schematically illustrates an elevator drive configured to provide machine braking according to an example embodiment.

FIG. 2 schematically illustrates selected portions of an example elevator drive 40 that provides machine braking that can be used even when the machine brake is unable to apply a sufficient braking force because the machine brake is malfunctioning or the load on the elevator car is too large for the machine brake to resist rotation of the traction sheave 32.

The example elevator drive 40 receives power from a power source, such as a utility grid, through a filter 42 when switch contactors 44 are turned on or conducting. The drive 40 includes known converter switches 46 and inverter switches 48 that are controlled to provide power to the motor 50 of the elevator machine 30 when needed for moving the elevator car 22. In the illustrated example embodiment, the converter switches 46 are IGBTs or MOSFETs and the inverter switches 48 are IGBTs or MOSFETs. The switch contactors 44 turn off or disconnect the power from the grid when the elevator car stops. The machine brake drops and applies a braking force to prevent the traction sheave 32 from rotating while the elevator car should remain stationary.

If the traction sheave 32 were to rotate under those conditions, the motor 50 generates back emf in a known manner that charges an energy storage device 52, which in this example embodiment comprises a capacitor. The back emf increases as the motor 50 rotates faster. The voltage across the capacitor 52 indicates the magnitude of the back emf. A controller 54 controls the converter switches 46 or turns them on to selectively discharge the capacitor 52 through a short-circuiting module 56. The controller 54 selectively controls the converter switches 46 based on the voltage across the capacitor to keep the back emf within a preselected range. The controller 54 maintains the voltage on the capacitor 52 and, therefore, the back emf below a predetermined threshold to limit the speed at which the motor 50 may rotate. Controlling the back emf of the motor 50 in this way effectively brakes rotation of the motor 50 and limits a speed at which the roping or suspension assembly 24 and the elevator car 22 may move. In some embodiments, the motor 50 is allowed to rotate at a maximum speed corresponding to movement of the elevator car 22 at 0.3 m/second.

In the illustrated example embodiment, the short-circuiting module 56 includes a switch 58 and resistors 60. The size or resistance of the resistors 60 is based on factors such as the duty load of the elevator car 22 and characteristics of the motor 50. The controller 54 monitors current flow through the resistors 60 in the illustrated example embodiment to verify that the short-circuiting module 56 is working as intended.

The illustrated example embodiment includes three resistors 60, one for each phase of the motor 50. Another embodiment includes two resistors connected across two of the phases instead of all three phases. Another embodiment includes a single resistor across the DC link capacitor with one switch.

The switch 58 is on or closed when the capacitor 52 should be discharged through the resistors 60. In some embodiments, the switch 58 turns on whenever the switch contactors 44 disconnect the drive 40 from the utility power grid or the elevator car is idle. The switch 58 comprises a relay switch in some embodiments.

The controller 54 is schematically shown in broken lines because it may be embodied in a physical component or be a function performed by the elevator drive 40. In some embodiments, the controller 54 comprises software or firmware added to the elevator drive 40. In other embodiments, at least one dedicated hardware component performs the function of the illustrated controller 54.

Figure 3:
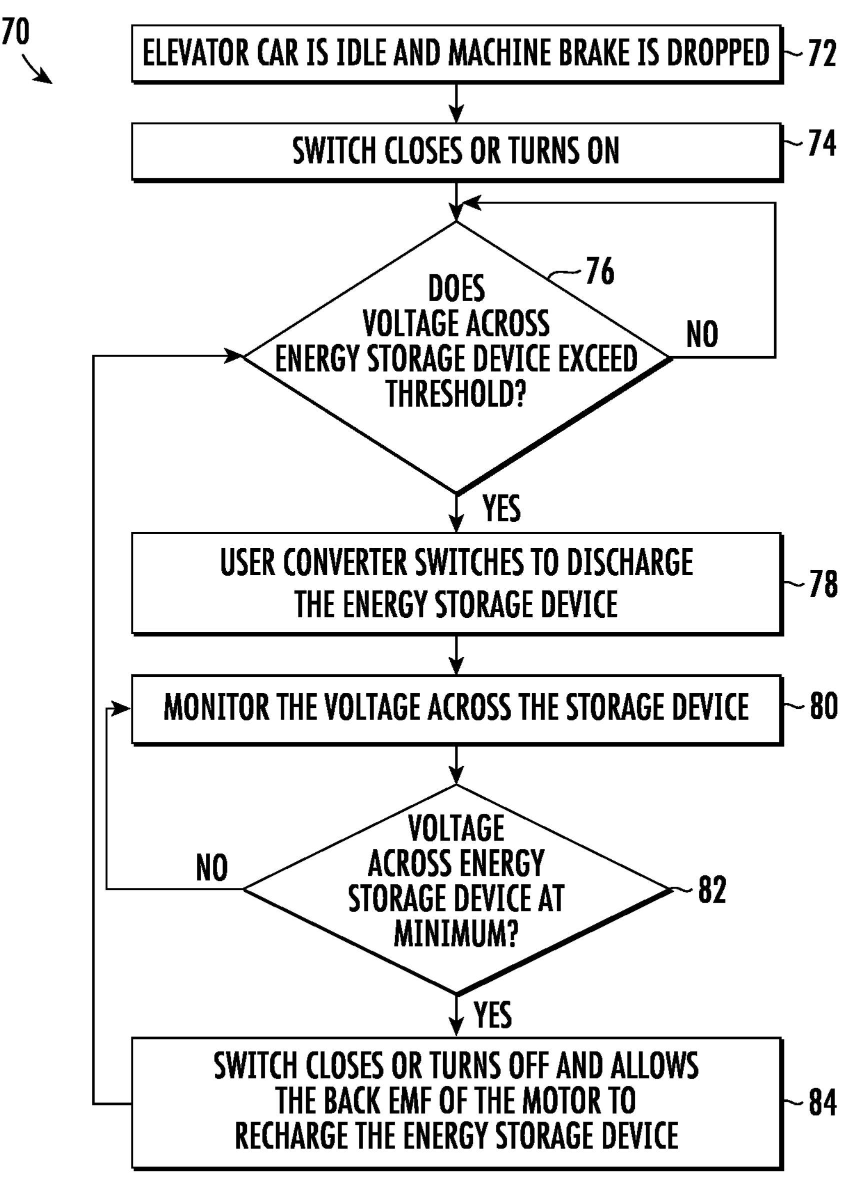
FIG. 3 is a flowchart diagram summarizing a braking method according to an example embodiment.

FIG. 3 is a flowchart diagram 70 summarizing an example method of controlling movement of the elevator car using elevator machine braking as described above. At 72, the elevator car 22 is idle and the machine brake is applied or dropped. The switch 58 closes or turns on at 74. The controller 54 determines whether the voltage across the capacitor 52 exceeds a preselected threshold at 76. When that voltage exceeds the threshold, at 78, the controller 54 turns on the converter IGBTs 46 to discharge the capacitor 52. The controller 54 monitors the voltage across the capacitor 52 at 80 and determines whether that voltage reaches a preselected base magnitude at 82. The brake control turns off the converter IGBTs 46 and allows the back emf of the motor 50 to recharge the capacitor 52 at 84 and continues to monitor the voltage across the capacitor at 76.

The method summarized in FIG. 3 repeatedly allows the back emf of the motor 50 to charge the capacitor 52 and then discharges the capacitor 52 to keep the back emf of the motor 50 within a desired range to maintain a speed of movement of the elevator car below a desired threshold. Controlling the back emf of the motor 50 in this way provides elevator machine braking even if the machine brake is unable to prevent the traction sheave 32 from rotating.

Some features or functions mentioned above as being included in an embodiment may be combined with at least one feature or function described as part of another embodiment. The features and functions described above may be combined in other ways to realize other embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator machine assembly, comprising:

a motor;

an elevator drive configured to control power supply to the motor, the elevator drive including at least a plurality of converter switches and an energy storage device, the energy storage device being situated to be charged in response to the motor generating a back emf as the motor rotates in response to a torque applied to the motor when the elevator drive is not providing power to the motor; and a short-circuiting module that is selectively coupled with the energy storage device through the converter switches to selectively discharge the energy storage device to limit the back emf of the motor and a corresponding speed at which the motor rotates.

2. The elevator machine assembly of claim 1, wherein the short-circuiting module comprises a plurality of resistors and a switch that selectively couples the resistors and the converter switches.

3. The elevator machine assembly of claim 2, wherein the switch of the short-circuiting module couples the resistors to the converter switches in response to the elevator drive disconnecting the motor from power.

4. The elevator machine assembly of claim 3, wherein the switch of the short-circuiting module comprises a relay switch that closes in response to the elevator drive disconnecting the motor from power.

5. The elevator machine assembly of claim 1, wherein the elevator drive comprises a brake control that determines a voltage of the energy storage device and controls the converter switches to selectively couple the short-circuiting module and the energy storage device to maintain the voltage of the energy storage device within a preselected range.

6. The elevator machine assembly of claim 5, wherein the converter switches each comprise an IGBT and the brake control turns on the IGBTs in response to the voltage exceeding a preselected threshold.

7. The elevator machine assembly of claim 6, wherein the brake control turns the IGBTs on and off repeatedly to allow the voltage of the energy storage device to repeatedly increase and decrease within the preselected range.

8. The elevator machine assembly of claim 5, wherein the energy storage device comprises a capacitor.

9. The elevator machine assembly of claim 1, wherein the short-circuiting module comprises a plurality of resistors and a switch that selectively couples the resistors to the converter switches;

the converter switches each comprise an IGBT; and the energy storage device comprises a capacitor.

10. The elevator machine assembly of claim 1, wherein the elevator drive comprises a brake control configured to:

monitor a voltage of the energy storage device as an indicator of the back emf of the motor;

turn on the plurality of converter switches to discharge the energy storage device through the short-circuiting module when the monitored voltage exceeds a first preselected threshold; and turn off the plurality of converter switches to allow the back emf of the motor to recharge the energy storage device when the monitored voltage drops to a second preselected threshold that is lower than the first preselected threshold, wherein the brake control repeatedly cycles between turning the plurality of converter switches on and off to maintain the back emf of the motor within a preselected range corresponding to a maximum motor speed.

11. A method of using an elevator machine to control movement of an associated elevator car, the elevator machine including a motor configured to selectively move the elevator car and an elevator drive configured to control power supply to the motor, the elevator drive having an energy storage device and converter switches, the method comprising:

determining that a voltage of the energy storage device exceeds a preselected threshold, wherein the voltage of the energy storage device is based on a back emf of the motor rotating when the elevator drive is not supplying power to the motor;

using the converter switches to couple the energy storage device and a short-circuiting module based on the voltage of the energy storage device exceeding the preselected threshold; and discharging the energy storage device using the short-circuiting module to maintain the voltage of the energy storage device and the back emf of the motor within respective preselected ranges.

12. The method of claim 11, comprising using the converter switches to uncouple the energy storage device from the short-circuiting module once the voltage of the energy storage device drops to a selected value.

13. The method of claim 12, comprising allowing the back emf of the motor to recharge the energy storage device and repeating each of:

determining that the voltage of the energy storage device exceeds the preselected threshold, using the converter switches to couple the energy storage device and the short-circuiting module, and discharging the energy storage device.

14. The method of claim 11, wherein the converter switches comprise IGBTs, and using the converter switches to couple the energy storage device and a short-circuiting module comprises selectively turning on the IGBTs.

15. The method of claim 11, wherein the short-circuiting module comprises a plurality of resistors and a switch that selectively couples the resistors and the converter switches in response to the elevator drive disconnecting the motor from power.

16. The method of claim 15, wherein the switch of the short-circuiting module comprises a relay switch that closes in response to the elevator drive disconnecting the motor from power.

17. The method of claim 11, comprising repeatedly turning the converter switches on and off to allow the voltage of the energy storage device to repeatedly increase and decrease within the preselected range.

18. The method of claim 11, wherein the energy storage device comprises a capacitor.

19. The method of claim 11, wherein the short-circuiting module comprises a plurality of resistors and a switch that selectively couples the resistors and the converter switches;

the converter switches each comprise an IGBT; and the energy storage device comprises a capacitor.

20. The method of claim 11, wherein the elevator drive comprises a brake control and including:

monitoring a voltage of the energy storage device as an indicator of the back emf of the motor;

turning on the converter switches to discharge the energy storage device through the short-circuiting module when the monitored voltage exceeds a first preselected threshold; and turning off the converter switches to allow the back emf of the motor to recharge the energy storage device when the monitored voltage drops to a second preselected threshold that is lower than the first preselected threshold, wherein the brake control repeatedly cycles between turning the converter switches on and off to maintain the back emf of the motor within a preselected range corresponding to a maximum motor speed.

* * * * *